(12) United States Patent
Nadimpalli et al.

(10) Patent No.: US 11,315,040 B2
(45) Date of Patent: Apr. 26, 2022

(54) SYSTEM AND METHOD FOR DETECTING INSTANCES OF LIE USING MACHINE LEARNING MODEL

(71) Applicant: Wipro Limited, Bangalore (IN)

(72) Inventors: Vivek Kumar Varma Nadimpalli, Hyderabad (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 217 days.

(21) Appl. No.: 16/830,311

(22) Filed: Mar. 26, 2020

(65) Prior Publication Data

US 2021/0248511 A1  Aug. 12, 2021

(30) Foreign Application Priority Data

Feb. 12, 2020  (IN) .............. 202041006125

(51) Int. Cl.
*G06K 9/62* (2006.01)
*G06N 20/00* (2019.01)
*G10L 15/22* (2006.01)
*G06K 9/46* (2006.01)
*G06K 9/00* (2022.01)
*G10L 15/26* (2006.01)

(52) U.S. Cl.
CPC ......... *G06N 20/00* (2019.01); *G06K 9/00744* (2013.01); *G06K 9/46* (2013.01); *G06K 9/6256* (2013.01); *G10L 15/22* (2013.01); *G10L 15/26* (2013.01)

(58) Field of Classification Search
CPC ...... G06N 20/00; G06K 9/00744; G06K 9/46; G06K 9/6256; G10L 15/22; G10L 15/26; G10L 17/04; G10L 17/18; G10L 17/26
USPC ....................................................... 382/156
See application file for complete search history.

(56) References Cited

U.S. PATENT DOCUMENTS

2008/0260212 A1   10/2008   Moskal et al.
2018/0025303 A1   1/2018    Janz
2020/0381130 A1*  12/2020   Edwards ................. G10L 25/48

FOREIGN PATENT DOCUMENTS

WO   2018151628 A1   8/2018
WO   2018232538 A1   12/2018

* cited by examiner

*Primary Examiner* — Charlotte M Baker
(74) *Attorney, Agent, or Firm* — Finnegan, Henderson, Farabow, Garrett & Dunner, LLP

(57) ABSTRACT

The disclosure relates to system and method for detecting an instance of lie using a Machine Learning (ML) model. In one example, the method may include extracting a set of features from an input data received from a plurality of data sources at predefined time intervals and combining the set of features from each of the plurality of data sources to obtain a multimodal data. The method may further include processing the multimodal data through an ML model to generate a label for the multimodal data. The label is generated based on a confidence score of the ML model. The label is one of a true value that corresponds to an instance of truth or a false value that corresponds to an instance of lie.

20 Claims, 6 Drawing Sheets

SYSTEM AND METHOD FOR DETECTING INSTANCES OF LIE USING MACHINE LEARNING MODEL

TECHNICAL FIELD

The present disclosure relates generally to lie detection, and more particularly to system and method for detecting instances of lie using a Machine Learning (ML) model.

BACKGROUND

Deception is a form of lying involving an attempt to make a person believe in an untrue statement. In a plurality of interrogatory scenarios such as criminology, high security job interviews, and the like, automated detection of an instance of lie from a conversation may be required to draw accurate inferences. Conventionally, lie detectors may be used to predict an instance of lie for a user. A polygraph test is a widely used technique in the lie detectors for a quantitative discrimination between the instance of lie and an instance of truth. The polygraph test detects an instance of lie based on a plurality of Autonomous Nervous System (ANS) responses such as breath rate, pulse, blood pressure, and the like.

However, in some scenarios, the polygraph test may be inaccurate. For example, a person giving a true statement may be nervous during an interrogation. The polygraph test may give a false positive result for the person. In some other conventional methods, a lie detection test may include a truth drug such as sodium thiopental, ethanol, or the like. The truth drug may have a plurality of side effects on human body.

In the current state of art, an automated lie detection test based on a predictive model for detecting the instance of lie for the user using a multimodal data derived from a plurality of data sources such as an audio source, a video source, and a brain signal source, has not yet been described. It may, therefore, be desirable to use a predictive model based on the multimodal data from the plurality of data sources to improve the lie detection test. For example, monitoring a person during an interrogation based on facial emotions, gestures, voice inputs, and Brain Computer Interface (BCI) data may make the lie detection test more robust and accurate.

SUMMARY

In one embodiment, a method for detecting an instance of lie using a Machine Learning (ML) model is disclosed. In one example, the method may include extracting, by the lie detection device, a set of features from an input data received from a plurality of data sources at predefined time intervals. The method may further include combining, by the lie detection device, the set of features from each of the plurality of data sources to obtain a multimodal data. The method may further include processing, by the lie detection device, the multimodal data through an ML model to generate a label for the multimodal data. The label may be generated based on a confidence score of the ML model. The label may be one of a true value that corresponds to an instance of truth or a false value that corresponds to an instance of lie.

In another embodiment, a system for detecting an instance of lie using a Machine Learning (ML) model is disclosed. In one example, the system may include a processor, and a computer-readable medium communicatively coupled to the processor. The computer-readable medium may store processor-executable instructions, which when executed by the processor, may cause the processor to extract a set of features from an input data received from a plurality of data sources at predefined time intervals. The stored processor-executable instructions, on execution, may further cause the processor to combine the set of features from each of the plurality of data sources to obtain a multimodal data. The stored processor-executable instructions, on execution, may further cause the processor to process the multimodal data through an ML model to generate a label for the multimodal data. The label is generated based on a confidence score of the ML model. The label is one of a true value that corresponds to an instance of truth or a false value that corresponds to an instance of lie.

In one embodiment, a non-transitory computer-readable medium storing computer-executable instructions for detecting an instance of lie using a Machine Learning (ML) model is disclosed. In one example, the stored instructions, when executed by a processor, may cause the processor to perform operations including extracting a set of features from an input data received from a plurality of data sources at predefined time intervals. The operations may further include combining the set of features from each of the plurality of data sources to obtain a multimodal data. The operations may further include processing the multimodal data through an ML model to generate a label for the multimodal data. The label is generated based on a confidence score of the ML model. The label is one of a true value that corresponds to an instance of truth or a false value that corresponds to an instance of lie.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
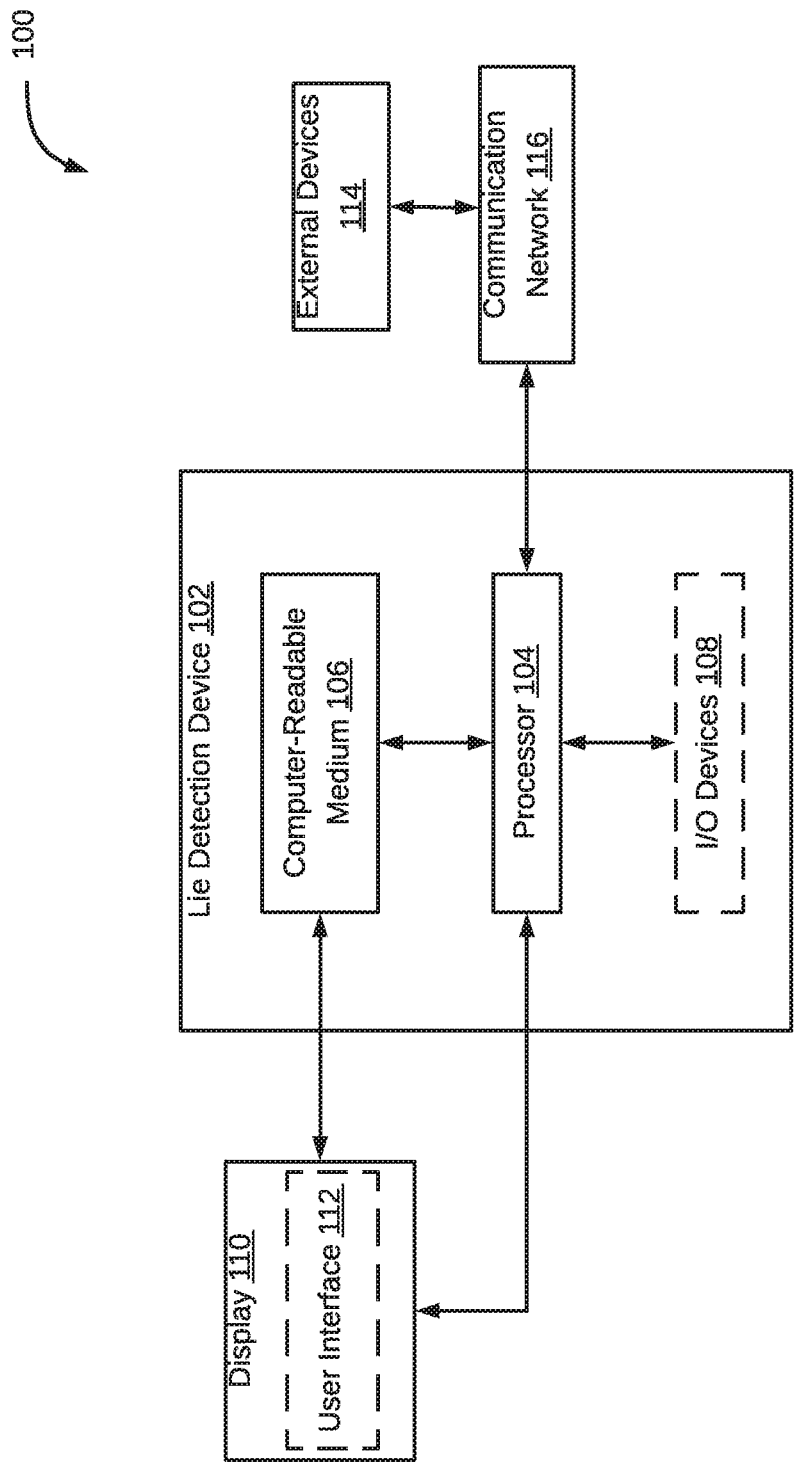
FIG. 1 is a block diagram of an exemplary system for detecting an instance of lie using a Machine Learning (ML) model, in accordance with some embodiments.

Referring now to FIG. 1, an exemplary system 100 for detecting an instance of lie using a Machine Learning (ML) model is illustrated, in accordance with some embodiments. As will be appreciated, the system 100 may implement ale detection engine in order to detect an instance of lie using the ML model. In particular, the system 100 may include a lie detection device 102 (for example, server, desktop, laptop, notebook, netbook, tablet, smartphone, mobile phone, or any other computing device) that may implement the lie detection engine. It should be noted that, in some embodiments, the lie detection engine may process multimodal data through the ML model so as to detect an instance of lie.

As will be described in greater detail in conjunction with FIGS. 2-5, the lie detection device may extract a set of features from an input data received from a plurality of data sources at predefined time intervals. The lie detection device may further combine the set of features from each of the plurality of data sources to obtain a multimodal data. The lie detection device may further process the multimodal data through an ML model to generate a label for the multimodal data. It may be noted that the label may be generated based on a confidence score of the ML model. It may also be noted that the label may be one of a true value that corresponds to an instance of truth or a false value that corresponds to an instance of lie.

In some embodiments, the lie detection device 102 may include one or more processors 104, a computer-readable medium (for example, a memory) 106, and input/output (I/O) devices 108. The system 100 may further include a display 110. The computer-readable storage medium 106 may store instructions that, when executed by the one or more processors 104, cause the one or more processors 104 to detect an instance of lie using an ML model, in accordance with aspects of the present disclosure. The computer-readable storage medium 106 may also store various data (for example, brain signal dataset, video dataset, audio dataset, multimodal data, ML model data, training dataset, label data and the like) that may be captured, processed, and/or required by the system 100. The I/O devices 108 may include a plurality of data sources for receiving the input data from a user. Further, the I/O devices 108 may include at least one device for providing an output of the lie detection device 102. By way of an example, the I/O devices 108 may include an audio source, a video source, and a Brain Computer Interface (BCI). In some embodiments, the I/O devices 108 may be located outside the lie detection device 102. The system 100 may interact with a user via a user interface 112 accessible via the display 110. The system 100 may also interact with one or more external devices 114 over a communication network 116 for sending or receiving various data. The external devices 114 may include, but may not be limited to, a remote server, a digital device, or another computing system.

Figure 2:
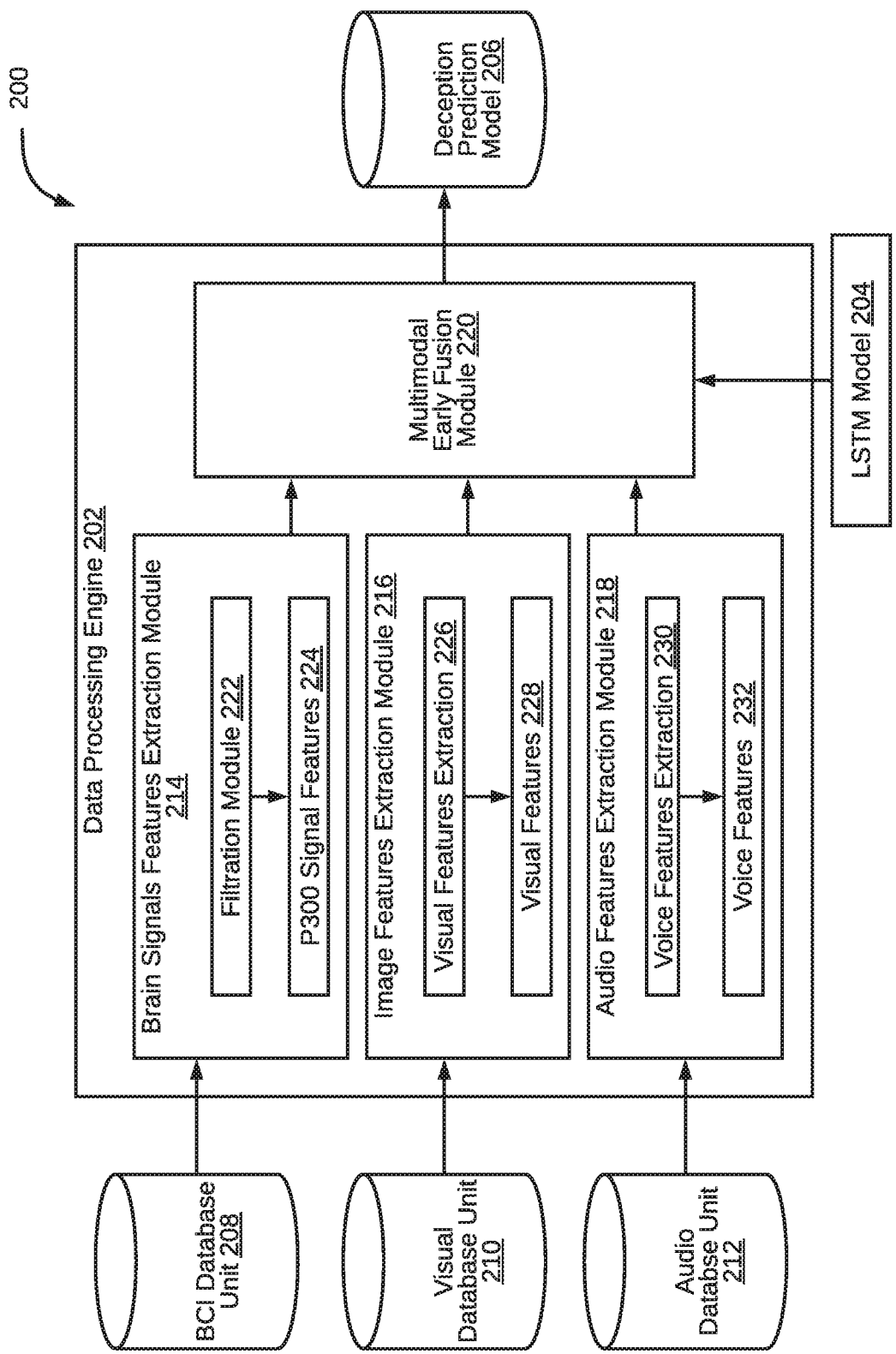
FIG. 2 is a functional block diagram of a lie detection device implemented by the exemplary system of FIG. 1, in accordance with some embodiments.

Referring now to FIG. 2, a functional block diagram of a lie detection device 200 (analogous to the lie detection device 102 implemented by the system 100) is illustrated, in accordance with some embodiments. The lie detection device 200 may include various modules that perform various functions so as to detect the instance of lie using the ML model. In some embodiments, the lie detection device 200 may include a data processing engine 202, a Long Short-Term Memory (LSTM) model 204, and a deception prediction model 206. The data processing engine 202 may receive the input data from the plurality of data sources. In some embodiments, the plurality of data sources may include a BCI database unit 208, a visual database unit 210, and an audio database unit 212. Further, the data processing engine 202 may include a brain signals features extraction module 214, an image features extraction module 216, an audio features extraction module 218, and a multimodal early fusion module 220.

In some embodiments, the BCI database unit 208 may include a brain signal dataset for a user, obtained from a non-invasive device, at predefined time intervals. By way of an example, the non-invasive device may be an Electroencephalography (EEG) device connected to the BCI. It may be noted that the brain signal dataset may include a plurality of brain signals and one or more noise signals. The brain signals features extraction module 214 may receive the brain signal dataset at predefined time intervals from the BCI database unit 208. Further, the brain signals features extraction module 214 may use a filtration module 222 to extract a set of P300 signal features 224. In some embodiments, the filtration module 222 may identify at least one predefined brain signal from the brain signal dataset using at least one of a set of data filtration techniques. In some embodiments, the at least one predefined brain signal may be a P300 signal. By way of an example, the set of data filtration techniques may include an independent component analysis or any other noise reduction technique. It may be noted that the set of data filtration techniques may increase a signal-to-noise ratio of the brain signal dataset.

Further, brain signals features extraction module 214 may extract the set of P300 signal features 224 from the at least one predefined brain signal received from the filtration module 222. It may be noted that the set of P300 signal features 224 may correspond to a set of brain signal features extracted from the at least one predefined brain signal. For example, the set of brain signal features may include a probe stimulus, a target stimulus, and an irrelevant stimulus. It may be noted that the probe stimulus may be related to deceptive information corresponding with a lying subject, the target stimulus may be related to nondeceptive information, and the irrelevant stimulus may be related to unknown information. It may also be noted that during an instance of lie, an energy vs time graph of the probe stimulus and the target stimulus may display a sharp peak. In some exemplary scenarios, the set of P300 signal features 224 may be assigned a label corresponding to the instance of lie or the instance of truth in a training dataset based on the probe stimulus and the target stimulus of the user at the predefined time interval. In such exemplary scenarios, the label for each of the set of P300 signal features 224 corresponding to the instance of lie may be a false value and the label for each of the set of P300 signal features 224 corresponding to the instance of truth may be a truth value. In some embodiments, the set of P300 signal features 224 may send the probe stimulus and the target stimulus obtained from the at least one predefined brain signal to the multimodal early fusion module 220.

In some embodiments, the visual database unit 210 may include a plurality of images obtained from a plurality of frames of a video dataset of the user at predefined time intervals. Further, the image features extraction module 216 may receive the plurality of images from the visual database unit 210. The image features extraction module 216 may include a visual features extraction 226 and a set of visual features 228. It may be noted that the set of visual features 228 may correspond to a set of image features extracted from the plurality of images using the visual features extraction 226. By way of an example, the set of visual features 228 may include facial expression features, facial gestures, body gestures, and the like. In some exemplary scenarios, the set of visual features 228 may be assigned the label corresponding to the instance of lie or the instance of truth in a training dataset based on based on facial emotions and gestures of the user at the predefined time interval. In such exemplary scenarios, the label for each of the set of visual features 228 corresponding to the instance of lie may be a false value and the label for each of the set of visual features 228 corresponding to the instance of truth may be a truth value. For example, a visual feature corresponding to a happy emotion may be mapped to an instance of truth, and a visual feature corresponding to the surprised emotion may be mapped to an instance of lie. Further, the image features extraction module 216 may send the set of visual features 228 extracted using the visual features extraction 226 to the multimodal early fusion module 220.

In some embodiments, the audio database unit 212 may include an audio dataset obtained from an audio recording of the user at predefined time intervals. In some exemplary scenarios, the audio dataset may be transformed to a textual dataset using an audio-to-text conversion algorithm, for each of the predefined time intervals. The audio features extraction module 218 may receive an audio dataset from the audio database unit 212. Further, audio features extraction module 218 may include a voice features extraction 230 and a set of voice features 232. It may be noted that the set of voice features 232 may correspond to at least one of a set of audio features extracted from the audio dataset, a set of textual features extracted from the textual dataset, or both, using the voice features extraction 230. For example, the set of voice features 232 may include a zero crossing rate, an energy, an entropy of the energy, a spectral centroid, a spectral spread, a spectral entropy, a spectral flux, a spectral roll off, and the like. It may be noted that the set of voice features 232 may be used to determine an emotion and a sentiment of the user at a predefined time interval. By way of example, the emotion may be happy, sad, angry, surprised, and the like. In some embodiments, the audio features extraction module 218 may create a word embedding based on the textual dataset to extract the set of textual features.

In some exemplary scenarios, the set of voice features 232 may be assigned the label corresponding to the instance of lie or the instance of truth in a training dataset based on the emotion and the sentiment of the user at the predefined time interval. In such exemplary scenarios, the label for each of the set of voice features 232 corresponding to the instance of lie may be a false value and the label for each of the set of voice features 232 corresponding to the instance of truth may be a truth value. For example, an audio feature corresponding to the surprised emotion may be mapped to an instance of lie, and an audio feature corresponding to the angry emotion may be mapped to an instance of truth. Further, the audio features extraction module 218 may send the set of voice features 232 extracted using the voice features extraction 230 to the multimodal early fusion module 220.

The multimodal early fusion module 220 may receive the set of P300 signal features 224, the set of visual features 228, and the set of voice features 232 from the brain signals features extraction module 214, the image features extraction module 216, and the audio features extraction module 218, respectively at predefined time intervals. Further, the multimodal early fusion module 220 may combine each of the set of P300 signal features 224, the set of visual features 228, and the set of voice features 232 at each of the predefined time intervals to obtain the multimodal data. In some embodiments, the multimodal early fusion module 220 may send the training dataset to the LSTM model 204. Further, the lie detection device 200 may be trained with the LSTM model 204 based on the multimodal data and a label assigned to each of the multimodal data.

Further, the multimodal early fusion module 220 may send the multimodal data to the deception prediction model 206. It may be noted that the deception prediction model 236 may be an LSTM model, a Recurrent Neural Network (RNN), or a Convolutional Neural Network (CNN). In some embodiments, the LSTM model 204 and the deception prediction model 206 may be in a single module. Further, the deception prediction model 206 may generate a label for each of the multimodal data and assign a confidence score for the label to draw an inference. In some exemplary scenarios, the deception prediction model 206 may assign a truth value label at a predefined time interval for the user with the confidence score of 90%. In such scenarios, the inference at the predefined time interval may be the instance of truth for the user. In some other scenarios, the user may be required to answer further questions when the confidence score is low. It may be noted that the lie detection device 200 may execute the described modules 202-232 with the input data received in real-time or offline.

It should be noted that all such aforementioned modules 202-232 may be represented as a single module or a combination of different modules. Further, as will be appreciated by those skilled in the art, each of the modules 202-232 may reside, in whole or in parts, on one device or multiple devices in communication with each other. In some embodiments, each of the modules 202-232 may be implemented as dedicated hardware circuit comprising custom application-specific integrated circuit (ASIC) or gate arrays, off-the-shelf semiconductors such as logic chips, transistors, or other discrete components. Each of the modules 202-232 may also be implemented in a programmable hardware device such as a field programmable gate array (FPGA), programmable array logic, programmable logic device, and so forth. Alternatively, each of the modules 202-232 may be implemented in software for execution by various types of processors (e.g., processor 104). An identified module of executable code may, for instance, include one or more physical or logical blocks of computer instructions which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for detecting the instance of lie using the ML model. For example, the exemplary system 100 and the associated lie detection device 200 may detect the instance of lie by the processes discussed herein. In particular, as will be appreciated by those of ordinary skill in the art, control logic and/or automated routines for performing the techniques and steps described herein may be implemented by the system 100 and the associated lie detection device 200, either by hardware, software, or combinations of hardware and software. For example, suitable code may be accessed and executed by the one or more processors 104 on the system 100 to perform some or all of the techniques described herein. Similarly, application specific integrated circuits (ASICs) configured to perform some or all of the processes described herein may be included in the one or more processors 104 on the system 100.

Figure 3:
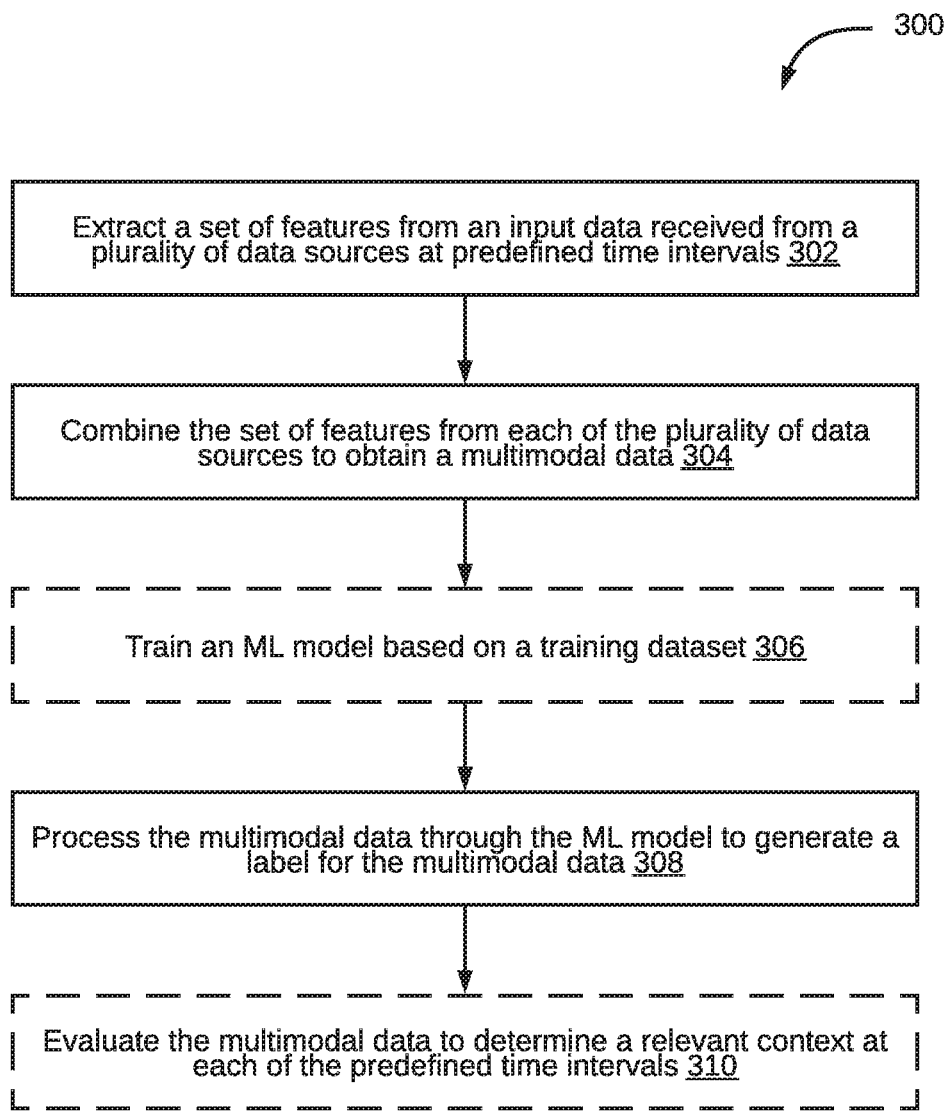
FIG. 3 is a flow diagram of an exemplary control logic for detecting an instance of lie using an ML model, in accordance with some embodiments.

Referring now to FIG. 3, an exemplary control logic 300 for detecting an instance of lie using an ML model is depicted via a flowchart, in accordance with some embodiments. In an embodiment, the control logic 300 may be executed by a system, such as the system 100 or the lie detection device 200. The control logic 300 may include, extracting a set of features from an input data received from a plurality of data sources at predefined time intervals, at step 302. For example, the input data corresponding to the plurality of data sources may include at least one of the brain signal dataset obtained from the EEG device for the user, the video dataset associated with the user, and the audio dataset associated with the user. In some embodiments, the plurality of data sources may correspond to the I/O devices 108 of the system 100. Further, at step 304, the set of features from each of the plurality of data sources may be combined to obtain the multimodal data. Additionally, at step 306, the ML model may be trained based on a training dataset. It may be noted that the training dataset comprises a truth dataset and a lie dataset. It may also be noted that the label for each data in the truth dataset is a true value and the label for each data in the lie dataset is a false value. Further, at step 308 of the control logic 300, the multimodal data may be processed through the ML model to generate a label for the multimodal data. It may be noted that the label is generated based on a confidence score of the ML model. It may also be noted that the label is one of a true value that corresponds to an instance of truth or a false value that corresponds to an instance of lie. In some embodiments, the ML model may be based on at least one of a Long Short-Term Memory (LSTM), a Recurrent Neural Network (RNN), or a Convolutional Neural Network (CNN). Further, the control logic 300 may include evaluating the multimodal data to determine a relevant context at each of the predefined time intervals, at step 310.

Figure 4:
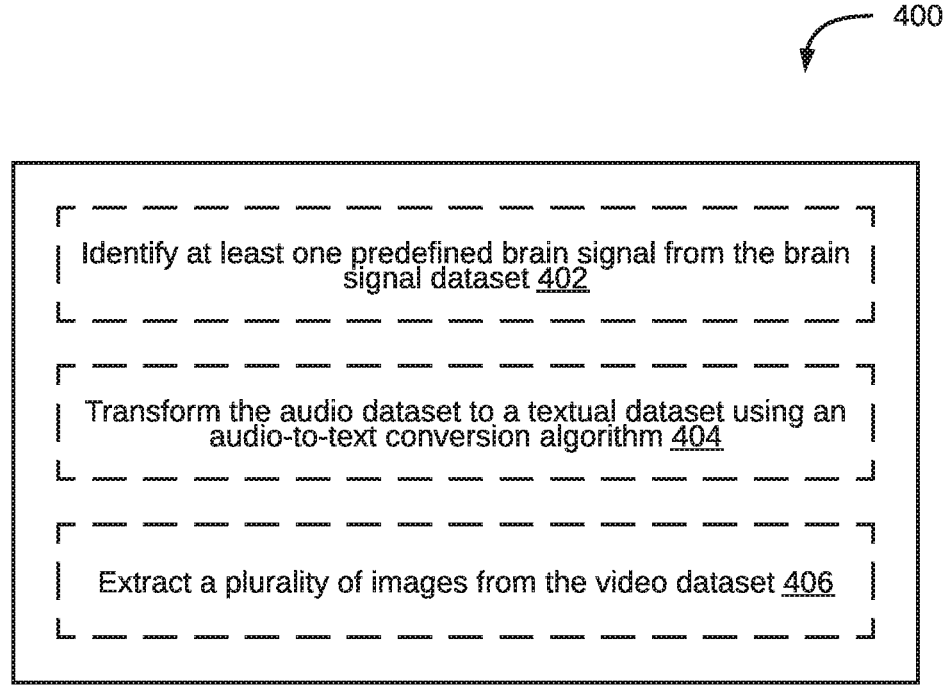
FIG. 4 is a flow diagram of an exemplary control logic for preprocessing an input data received from a plurality of data sources, in accordance with some embodiments.

Referring now to FIG. 4, an exemplary control logic 400 for preprocessing the input data received from a plurality of data sources is depicted via a flowchart, in accordance with some embodiments. It may be noted that the input data corresponding to the plurality of data sources may include at least one of a brain signal dataset obtained from an Electroencephalography (EEG) device for a user, the video dataset associated with the user, and an audio dataset associated with the user. The control logic 400 may include identifying at least one predefined brain signal from the brain signal dataset, at step 402. In some embodiments, the step 402 of the control logic 400 may be executed by the filtration module 222 of the lie detection device 200. Further, at step 404, the audio dataset may be transformed to a textual dataset using an audio-to-text conversion algorithm. Further, at step 406, a plurality of images may be extracted from the video dataset. It may be noted that the steps 404-406 of the control logic 400 may be implemented by the lie detection device 200. In conjunction with FIG. 3, the set of features in the step 302 may include at least one of a set of brain signal features extracted from the at least one predefined brain signal, a set of image features extracted from the plurality of images, a set of audio features extracted from the audio dataset, and a set of textual features extracted from the textual dataset.

Figure 5:
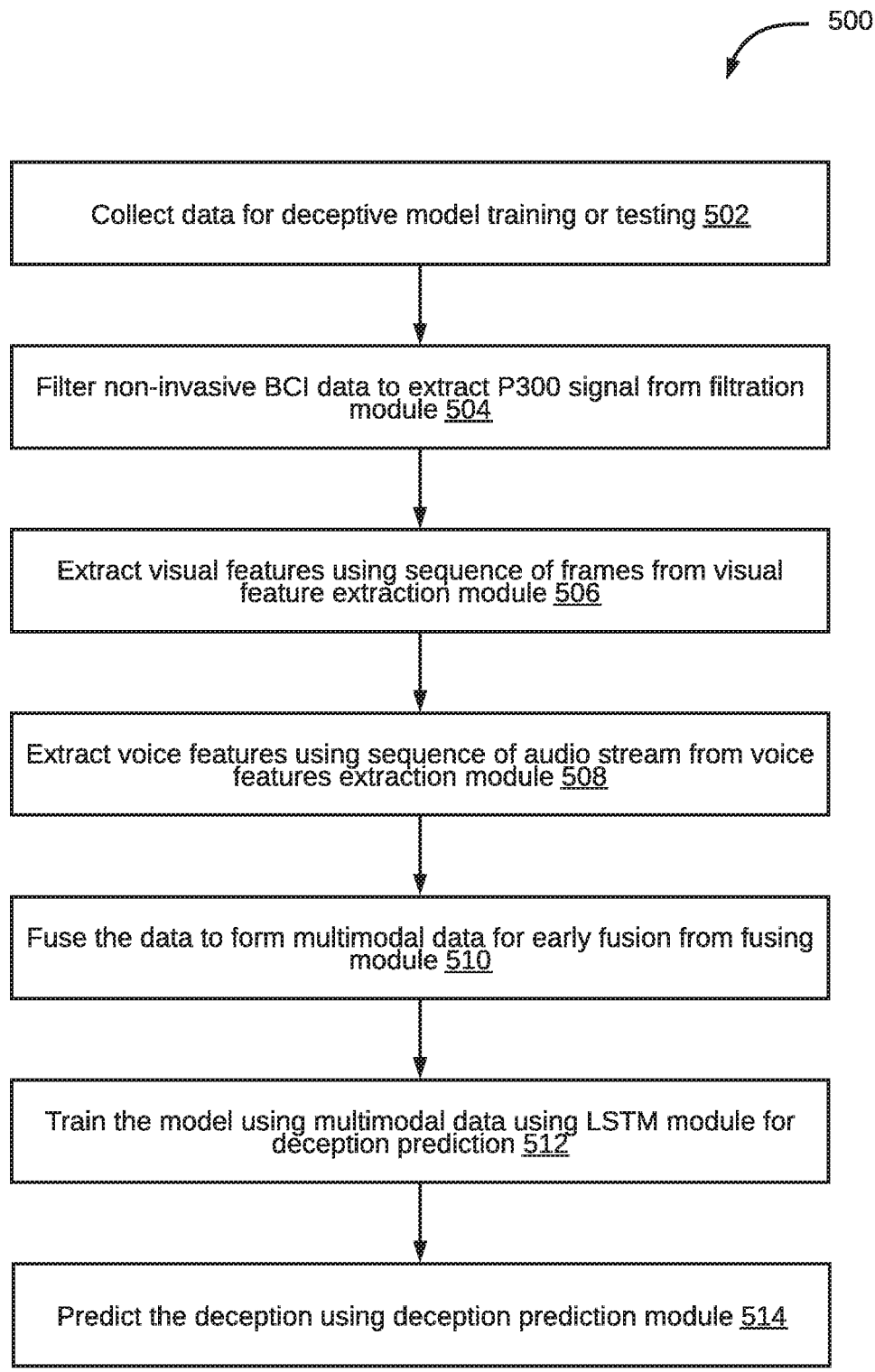
FIG. 5 is a flow diagram of a detailed exemplary control logic for detecting an instance of lie using an ML model, in accordance with some embodiments.

Referring now to FIG. 5, a detailed exemplary control logic 500 for detecting an instance of lie using an ML model is depicted via a flowchart, in accordance with some embodiments. The control logic 500 may include, at step 502, collecting data for training or testing the deception prediction model 206. In some embodiments, the BCI database unit 208 may receive the brain signal dataset from the user using the non-invasive device. By way of an example, the non-invasive device may be the EEG device connected with the BCI. Similarly, the visual database unit 210 and the audio database unit 212 may receive the video dataset and an audio dataset from the video source and the audio source, respectively. Further, the user may be interrogated and each of the plurality of answers of the user may be used to prepare the training dataset. It may be noted that the label may be assigned to each data in the training dataset. In some embodiments, the training dataset comprises a truth dataset and a lie dataset. It may be noted that the label for each data in the truth dataset is a true value and the label for each data in the lie dataset is a false value. Further, the training dataset may be used for a supervised training model for lie detection. In some embodiments, the video dataset may be divided into the plurality of frames corresponding to each of the predefined time intervals. Further, the plurality of frames may be used to obtain the plurality of images. By way of an example, the plurality of images may be sequenced as:

$$V=(V_1, V_2, V_3, \ldots, V_n) \qquad (1)$$

where $V_i$ is a sequence of the plurality of images for the predefined time interval, i=1, 2, . . . , n.

Similarly, the audio dataset and the brain signal dataset may be divided on the basis of the predefined time intervals and sequenced as:

$$A=(A_1, A_2, A_3, \ldots, A_n) \qquad (2)$$

where $A_i$ is a sequence of the audio dataset for the predefined time interval, i=1, 2, . . . , n.

$$B=(B_{t_1}, B_{t_2}, B_{t_3}, \ldots, B_{t_n}) \qquad (3)$$

where $B_{t_i}$ is a sequence of the brain signal dataset for each time epoch $t_i$; and the predefined time interval, i=1, 2, . . . , n Further, for each time epoch, the brain signal dataset may include a plurality of signals represented as:

$$B_{t_1}=(B_{t_11}, B_{t_12}, B_{t_13}, \ldots, B_{t_1m}) \qquad (4)$$

where $B_{t_1}$ is a sequence from the brain signal dataset for a time epoch $t_1$ $$B_{t_2}=(B_{t_21}, B_{t_22}, B_{t_23}, \ldots, B_{t_2m}) \qquad (5)$$

where $B_{t_2}$ is a sequence from the brain signal dataset for a time epoch $t_2$

. . .

$$B_{t_n}=(B_{t_n1}, B_{t_n2}, B_{t_n3}, \ldots, B_{t_nm}) \qquad (6)$$

where $B_{t_n}$ is a sequence from the brain signal dataset for a time epoch $t_n$ Further, the lie detection device 200 may extract the set of features from using at least one pretrained model and combine the set of features from the plurality of data sources to obtain the multimodal data. Further, the multimodal data may be used to train the deception prediction model 206. In some embodiments, the video dataset may receive real-time video data from the video source, the brain signal dataset may receive real-time brain signal data from the EEG device, and the audio dataset may receive real-time audio data from an audio source in real-time. In such embodiments, the real-time video data may be divided into a plurality of frames at the predefined time intervals. By way of an example, the plurality of frames may be sequenced as:

$$VR=(VR_1,VR_2,VR_3,\ldots,VR_n) \quad (7)$$

where $VR_i$ is a sequence of the plurality of frames of the real-time video data at the predefined interval, i=1, 2, ..., n Similarly, the real-time audio data may be divided based on the predefined time intervals and represented as:

$$AR=(AR_1,AR_2,AR_3,\ldots,AR_n) \quad (8)$$

where $AR_i$ is a sequence of the real-time audio data at the predefined time interval, i=1, 2, ..., n Similarly, the real-time brain signal data may be divided based on the time epoch of arrival of the real-time brain signal data and represented as:

$$BR_i=(BR_{t_1},BR_{t_2},BR_{t_3},\ldots,BR_{t_n}) \quad (9)$$

where $BR_{t_i}$ is a sequence of the real-time brain signal data at the predefined time interval, i=1, 2, ... n Further, the real-time brain signal data may include a plurality of brain signals represented as:

$$BR_{t_1}=(BR_{t_11},BR_{t_12},BR_{t_13},\ldots,BR_{t_1m}) \quad (10)$$

where $BR_{t_1}$ is the real-time brain signal data for the time epoch $t_1$ $$BR_{t_2}=(BR_{t_21},BR_{t_22},BR_{t_23},\ldots,BR_{t_2m}) \quad (11)$$

where $BR_{t_2}$ is the real-time brain signal data for the time epoch $t_2$

...

$$BR_{t_n}=(BR_{t_n1},BR_{t_n2},BR_{t_n3},\ldots,BR_{t_nm}) \quad (12)$$

where $BR_{t_n}$ is the real-time brain signal data for the time epoch $t_n$

Further, the set of features extracted from the input data may be combined to obtain the multimodal data in the form of a multimodal feature vector to test the model in real time for detecting the instance of lie. Further, the brain signal dataset may be filtered to extract P300 signal from the filtration module 222, at step 504. In some embodiments, the sequence of the brain signal dataset received from the EEG device may include a plurality of brain signals and noise. It may be noted that the sequence of the brain signal dataset may be processed through at least one data filtration model to obtain the P300 signal indicating a high-level cognitive process. For example, the high-level cognitive process may be memory, language, or the like. Further, the lie detection device 200 may pass the P300 signal through the at least one data filtration model to determine the probe stimulus (corresponding with information related to hidden things known only to a lying user) and the target stimulus (corresponding with universally known information).

In some embodiments, the probe stimulus and the target stimulus may be represented in time domain and scattered energy distribution. In some embodiments, the lie detection device 200 may track the probe stimulus and the target stimulus in the plurality of frames to determine a relevant context of the predefined time interval. Further, the probe stimuli may be represented as:

$$P=(P_1,P_2,P_3,\ldots,P_n) \quad (13)$$

where $P_i$ is a sequence of the probe stimulus for the predefined time interval, i=1, 2, ..., n. It may be noted that the probe stimulus represents data corresponding with the instance of lie.

The target stimuli can be represented as $$T=(T_1,T_2,T_3,\ldots,T_n) \quad (14)$$

where $T_i$ is a sequence of the target stimulus for the predefined time interval i=1, 2, ..., n. It may be noted that the target stimulus represents data corresponding with the instance of truth.

By way of an example, when the user may be lying, there may be a spike in the energy distribution after 300 milliseconds (ms) for the probe stimulus. It may be noted that the probe stimulus and the target stimulus may be used by the deception prediction model 206 in further steps. Further, at step 506, the set of image features may be extracted using the sequence of the plurality of images from the visual feature extraction module 226. In some embodiments, a set of image features may be extracted from the plurality of images. Some examples for the set of image features may include facial key points, body key points, facial features, facial gestures, orientation, and the like. Further, at least one feature extraction model may be trained for extracting image features such as facial key points, body key points, facial features, facial gestures, and the like. Additionally, at least one computer vision heuristics model may be trained for extracting other image features such as orientation, and the like. The lie detection device 200 may use the set of image features to determine secondary image features such as facial expressions or emotions, body language, gestures, and the like. It may be noted that the lie detection device 200 may determine the label for each of the multimodal data. For example, the body language of the user during the instance of lie may be different when compared to the body language of the user during the instance of truth.

Further, the lie detection device 200 may track the set of image features in the sequence of the plurality of frames to determine the relevant context of the predefined time interval. For example, when the user may be looking up and talking to an interrogator during the interrogation, the lie detection device 200 may receive subsequent plurality of frames for the facial features. Further, when the user may be continuously looking away from the interrogator for a threshold number of frames, the lie detection device 200 may determine the relevant context corresponding to the user not facing the interrogator.

By way of an example, let:

$$VF=(VF_1,VF_2,VF_3,\ldots,VF_n) \quad (15)$$

where VF is the set of image features for the predefined time interval i=1, 2, ..., n extracted from the plurality of images.

Further, each of the plurality of images may include a set of image features which may be represented as:

$$VF_1=(VF_{11},VF_{12},VF_{13},\ldots,VF_{1m}) \quad (16)$$

where $VF_{1j}$ is the $j^{th}$ image feature extracted from a first of the plurality of images for each j=1, 2, ..., m $$VF_2=(VF_{21},VF_{22},VF_{23},\ldots,VF_{2m}) \quad (17)$$

where $VF_{2j}$ is the $j^{th}$ image feature extracted from a second of the plurality of images for each j=1, 2, ..., m

...

$$VF_n=(VF_{n1},VF_{n2},VF_{n3},\ldots,VF_{nm}) \quad (18)$$

where $VF_{nj}$ is the $j^{th}$ image feature extracted from an $n^{th}$ of the plurality of images for each j=1, 2, ..., m In some embodiments, the set of image features may be assigned a label based on the relevant context associated with each of the plurality of images. Further, the set of image features may be used as a part of the multimodal data for training the deception prediction model 206. Additionally, at step 508, the set of audio features may be extracted using the sequence of audio dataset from the voice features extraction module 230. In some embodiments, the set of audio features may be extracted from the sequence of the audio dataset. It may be noted that the audio dataset may be transformed to the textual dataset using the audio-to-text conversion algorithm. By way of an example, the set of textual features may include word embeddings (semantic features), and the like. As will be appreciated, the set of textual features may aid in determining the emotion and the sentiment of the user at each of the predefined time intervals, corresponding to the interrogation. It may be noted that the lie detection device 200 may determine the set of audio features or the set of textual features associated with the instance of lie and the set of audio features associated with the instance of truth for the training dataset. Further, the word embeddings may be a part of the multimodal data for the training dataset of the deception prediction model 206.

By way of an example, the textual dataset and the set of textual features may be represented as:

$$Text=(text_1,text_2,text_3,\ldots,text_n) \quad (19)$$

where, $text_i$ is a sequence of a plurality of sentences associated with the textual dataset for the predefined time interval, i=1, 2, . . . , n By way of an example, the set of textual features associated with the plurality of sentences may be represented as:

$$text_1=(text_{11},text_{12},\ldots,text_{1n}) \quad (20)$$

$$text_2=(text_{21},text_{22},\ldots,text_{2n}) \quad (21)$$

$$\ldots$$

$$text_n=(text_{n1},text_{n2},text_{n3},\ldots,text_{nn}) \quad (22)$$

where, $text_{ij}$ is the textual features associated with for each i=1, 2, . . . , n; j=1, 2, . . . , n Further, the set of audio features may include, for example, zero crossing rate, energy, entropy of energy, spectral centroid, spectral spread, spectral entropy, spectral flux, spectral roll off, entropy of energy, and the like. In some embodiments, the set of audio features may be used by the lie detection device 200 to determine a set of secondary features such as the sentiment, the emotion, and the like. It may be noted that the LSTM model 204 or the deception prediction model 206 may generate the label for each of the multimodal data based on the set of audio features. For example, a tone of the user may be different during the instance of lie as compared to the instance of truth. It may, therefore, be noted that the set of audio features may be a part of the multimodal data in the training dataset. In some embodiments, the lie detection device 200 may track the set of audio features in the sequence of the audio dataset to determine the relevant context of the scenario. For example, the lie detection device 200 may require the sequence of the audio dataset associated with the user to infer a complete sentence and extract semantic embeddings, and the like.

By way of an example, the set of audio features may be represented as:

$$AF=(AF_1,AF_2,AF_3,\ldots,AF_n) \quad (23)$$

where $AF_i$ is a sequence of the audio dataset at the predefined time interval i=1, 2, . . . n Further, each data of the audio dataset may include a set of audio features. By way of an example, the set of audio features may be represented as:

$$AF_1=(AF_{11},AF_{12},AF_{13},\ldots,AF_{1m}) \quad (24)$$

$$AF_2=(AF_{21},AF_{22},AF_{23},\ldots,AF_{2m}) \quad (25)$$

$$\ldots$$

$$AF_n=(AF_{n1},AF_{n2},AF_{n3},\ldots,AF_{nm}):AF_{nj} \quad (26)$$

where $AF_{ij}$ is a $j^{th}$ of the set of audio features extracted from $i^{th}$ data of the audio dataset for each j=1, 2, . . . , m It may be noted that the lie detection device 200 may determine the relevant context associated with the user during the interrogation, based on the set of audio features. In some embodiments, the set of audio features may be a part of the multimodal data sent to the deceptive prediction model 206. Further, the control logic 500 may include combining the set of features received from the plurality of data sources to form the multimodal data using the multimodal early fusion module 220, at step 510. In some embodiments, the probe stimulus from the brain signal dataset (P), the target stimulus from the brain signal dataset (T), the set of image features (VF), the set of textual features (text), and the set of audio features (AF) may be combined at each of the predefined intervals during training phase to obtain the multimodal data for detecting the instance of lie for the user. In some embodiments, the input data from the plurality of data sources at each of the predefined intervals may be combined to obtain the multimodal data. Further, the input data or the set of features from a plurality of data sources may be combined with the label using an early fusion technique. By way of an example, the multimodal data may be represented as:

$$M=(M_1,M_2,M_3,\ldots,M_n) \quad (27)$$

where, $M_i$ is a sequence of the multimodal data for the predefined time interval i=1, 2, . . . , n.

Further, each data of the multimodal data may include the set of features from the brain signal dataset, the plurality of images, the audio dataset, and the textual dataset, represented as:

$$M_1=(P_1,T_1,VF_1,text_1,AF_1) \quad (28)$$

$$M_2=(P_2,T_2,VF_2,text_2,AF_2) \quad (29)$$

$$\ldots$$

$$M_n=(P_n,T_n,VF_n,text_n,AF_n) \quad (30)$$

where:

$P_n$ is the probe stimulus from the brain signal dataset extracted in an $n^{th}$ of the predefined time intervals $T_n$ is the target stimulus from the brain signal dataset extracted in the $n^{th}$ of the predefined time intervals $VF_n$ is a video feature extracted from an $n^{th}$ of the plurality of frames of the multimodal data, $text_n$ is a textual feature extracted from an $n^{th}$ of the plurality of frames of the multimodal data, and $AF_n$ is an audio feature extracted from the $n^{th}$ of the plurality of frames of the multimodal data.

Further, the deception prediction model 206 may be trained based on the multimodal data using the LSTM model 204 for detecting the instance of lie, at step 512. In some embodiments, the training dataset may be used to train the LSTM model 204. It may be noted that the training dataset may include the multimodal data with the label assigned to each data of the multimodal data. In some embodiments, the multimodal data may be collected from a test user and categorized into the truth dataset and the lie dataset. Further, the multimodal data may be used to assign the label to each data of the multimodal data. By way of an example, the multimodal data used for training may be represented as:

$$M = (M_1, M_2, M_3, \ldots, M_n) \tag{31}$$

$$\text{where } M_i = \{P_i, T_i, VF_i, \text{text}_i, AF_i\} \tag{32}$$

is a sequence of the multimodal data at the predefined time interval i=1, 2, 3, . . . n.
where, $P_i$ is the probe stimulus from the set of brain signal features extracted from an $n^{th}$ of the plurality of frames or at the predefined time interval in the multimodal data,
$T_i$ is the target stimulus from the set of brain signal features extracted from the $n^{th}$ of the plurality of frames or at the predefined time intervals in the multimodal data,
$VF_i$ is a visual feature extracted from the $n^{th}$ of the plurality of frames in the multimodal data,
$\text{text}_n$ is a textual feature extracted from an $n^{th}$ of the plurality of frames of the multimodal data, and
$AF_i$ is an audio feature extracted from the $n^{th}$ of the plurality of frames in the multimodal data.

In some exemplary scenarios, the label may be assigned as {1,0} for the deception prediction model 206 to be trained. It may be noted that the label {1} may be mapped to the instance of truth and the label {0} may be mapped to the instance of false. Further, each data in the truth dataset may be assigned {1} as the label and each data in the lie dataset may be assigned {0} as the label. In some embodiments, the multimodal data may be sent to the LSTM model 204, in a testing phase. Further, the LSTM model 204 may determine an output and may detect the instance of truth or the instance of lie based on a real-time multimodal data.

Further, the instance of lie may be detected using the deception prediction model 206, at step 514. In some embodiments, upon assigning the label to each data in the multimodal data, the lie detection device 200 may calculate a confidence score of the output based on values of an output layer of the LSTM model 204. It may be noted that the inference at each of the predefined time intervals during the interrogation may be determined based on the label and the confidence score. For example, the user may be asked a question and a real-time input data may be received. Further, the lie detection device 200 may draw the inference for the instance of lie when the label may be the false value and the confidence score may be 90%.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
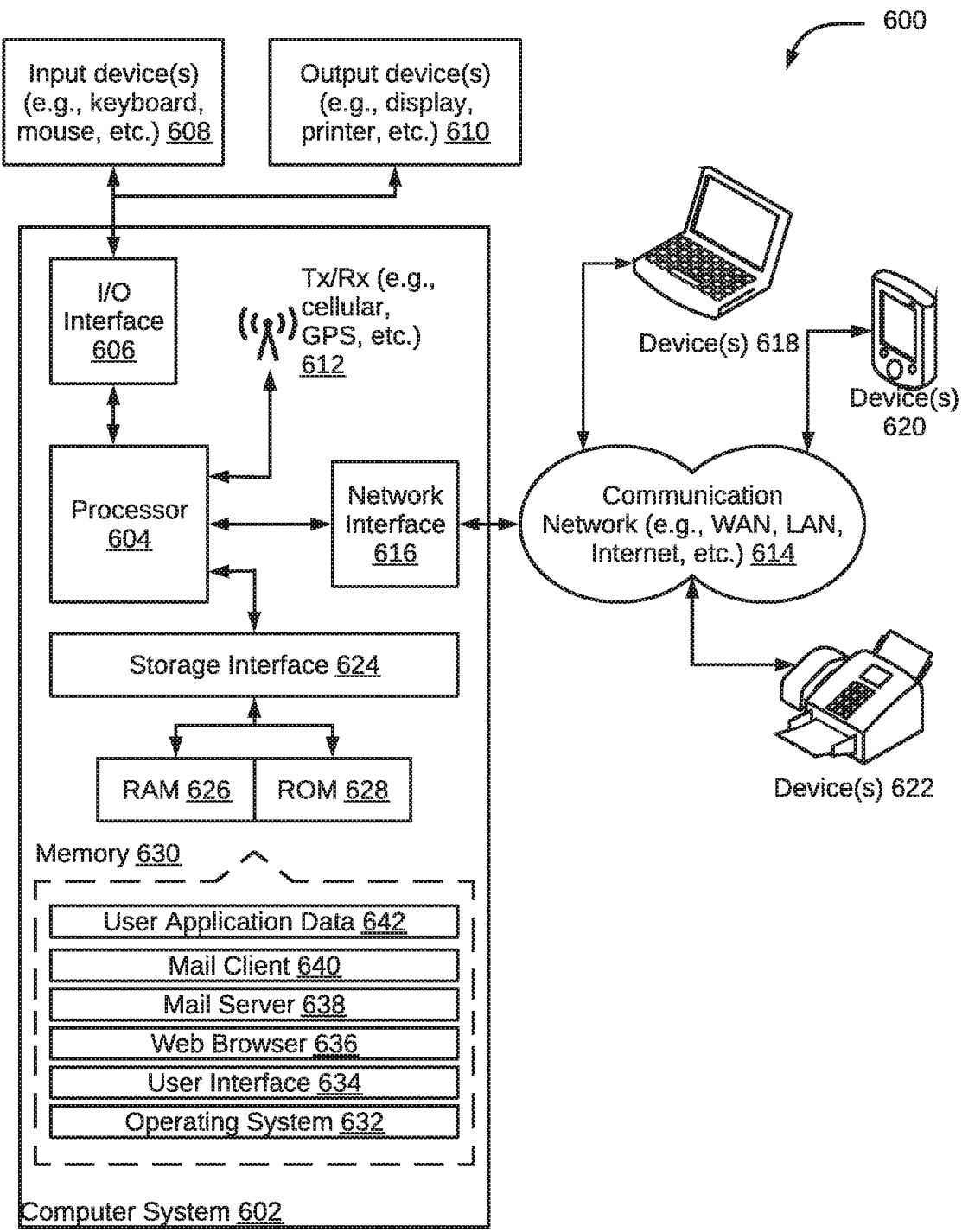
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 602 for implementing embodiments consistent with the present disclosure is illustrated. Variations of computer system 602 may be used for implementing system 100 for extracting software development requirements from natural language information. Computer system 602 may include a central processing unit ("CPU" or "processor") 604. Processor 604 may include at least one data processor for executing program components for executing user-generated or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via I/O interface 606. The I/O interface 606 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 606, the computer system 602 may communicate with one or more I/O devices. For example, the input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with the processor 604. The transceiver may facilitate various types of wireless transmission or reception. For example, the transceiver may include an antenna operatively connected to a transceiver chip (e.g., TEXAS INSTRUMENTS® WILINK WL1286@, BROADCOM® BCM45501UB8®, INFINEON TECHNOLOGIES®

X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 604 may be disposed in communication with a communication network 616 via a network interface 614. The network interface 614 may communicate with the communication network 616. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 616 may include, without limitation, a direct interconnection, local area network (LAN), wide area network (WAN), wireless network (e.g., using Wireless Application Protocol), the Internet, etc. Using the network interface 614 and the communication network 616, the computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX, NINTENDO® DS®, SONY® PLAYSTATION®, etc.), or the like. In some embodiments, the computer system 602 may itself embody one or more of these devices.

In some embodiments, the processor 604 may be disposed in communication with one or more memory devices (e.g., RAM 626, ROM 628, etc.) via a storage interface 624. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 632, user interface application 634, web browser 636, mail server 638, mail client 640, user/application data 642 (e.g., any data variables or data records discussed in this disclosure), etc. The operating system 632 may facilitate resource management and operation of the computer system 602. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 634 may facilitate display, execution, interaction, manipulation, or operation of program components through textual or graphical facilities. For example, user interfaces may provide computer interaction interface elements on a display system operatively connected to the computer system 602, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE FLASH®, etc.), or the like.

In some embodiments, the computer system 602 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 602 may implement a mail server 638 stored program component. The mail server may be an Internet mail server such as MICROSOFT® EXCHANGE®, or the like. The mail server may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 602 may implement a mail client 640 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 602 may store user/application data 642, such as the data, variables, records, etc. (e.g., brain signal dataset, plurality of images, audio dataset, textual dataset, the set of features (probe stimulus, target stimulus, facial features, body language, word embeddings, voice features, etc.), predictive models (LSTM model, data filtration model, etc.) labels, confidence scores, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for detecting instances of lie using an ML model. The techniques employ processing multimodal data in order to achieve the same. The multimodal data facilitates a robust and an accurate detection of instances of lie. For example, the method may reduce false positives compared to a conventional lie detection test by processing a combination of the brain signal dataset, the video dataset, and the audio dataset associated with the user. Further, the multimodal data allows determination of the relevant context of the user at each of the predefined time intervals. Further, the method may be implemented with a real-time input data or in an offline mode. Further, the method is non-invasive and does not involve use of drugs or chemicals which may carry harmful side effects. Further, the method the method provides the confidence score for the output to determine inferences at each of the predefined time intervals.

Thus, the disclosed method and system try to overcome to technical problem of reliably detecting an instance of lie using the ML model. Specifically, the claimed limitations of the present disclosure overcome the aforementioned technical problem by receiving an input data from a plurality of data sources, extracting the set of features from the input data, combining the set of features to obtain the multimodal data, and processing the multimodal data through the ML model to generate the label for the multimodal data. The disclosed method and system provide a robust framework for detecting the instance of lie over the present state of the art.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a system and method for detecting instances of lie using an ML model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting an instance of lie using a Machine Learning (ML) model, the method comprising:
   extracting, by a lie detection device, a set of features from an input data received from a plurality of data sources at predefined time intervals;
   combining, by the lie detection device, the set of features from each of the plurality of data sources to obtain a multimodal data; and
   processing, by the lie detection device, the multimodal data through the ML model to generate a label for the multimodal data, wherein the label is generated based on a confidence score of the ML model, and wherein the label is one of a true value that corresponds to an instance of truth or a false value that corresponds to an instance of lie.

2. The method of claim 1, wherein the input data corresponding to the plurality of data sources comprises at least one of a brain signal dataset obtained from an Electroencephalography (EEG) device for a user, a video dataset associated with the user, and an audio dataset associated with the user.

3. The method of claim 2, further comprising:
   identifying at least one predefined brain signal from the brain signal dataset;
   transforming the audio dataset to a textual dataset using an audio-to-text conversion algorithm; and
   extracting a plurality of images from the video dataset.

4. The method of claim 3, wherein the set of features comprises at least one of a set of brain signal features extracted from the at least one predefined brain signal, a set of image features extracted from the plurality of images, a set of audio features extracted from the audio dataset, and a set of textual features extracted from the textual dataset.

5. The method of claim 1, further comprising training the ML model based on a training dataset, wherein the training dataset comprises a truth dataset and a lie dataset, and wherein the label for each data in the truth dataset is a true value and the label for each data in the lie dataset is a false value.

6. The method of claim 1, further comprising evaluating the multimodal data to determine a relevant context at each of the predefined time intervals.

7. The method of claim 1, wherein the ML model is based on at least one of a Long Short-Term Memory (LSTM), a Recurrent Neural Network (RNN), or a Convolutional Neural Network (CNN).

8. A system for detecting an instance of lie using a Machine Learning (ML) model, the system comprising:
   a plurality of data sources;
   a processor; and
   a computer-readable medium communicatively coupled to the processor, wherein the computer-readable medium stores processor-executable instructions, which when executed by the processor, cause the processor to:
      extract a set of features from an input data received from a plurality of data sources at predefined time intervals;
      combine the set of features from each of the plurality of data sources to obtain a multimodal data; and
      process the multimodal data through the ML model to generate a label for the multimodal data, wherein the label is generated based on a confidence score of the ML model, and wherein the label is one of a true value that corresponds to an instance of truth or a false value that corresponds to an instance of lie.

9. The system of claim 8, wherein the input data corresponding to the plurality of data sources comprises at least one of a brain signal dataset obtained from an Electroencephalography (EEG) device for a user, a video dataset associated with the user, and an audio dataset associated with the user.

10. The system of claim 9, wherein the processor-executable instructions, on execution, further cause the processor to:
    identify at least one predefined brain signal from the brain signal dataset;
    transform the audio dataset to a textual dataset using an audio-to-text conversion algorithm; and
    extract a plurality of images from the video dataset.

11. The system of claim 10, wherein the set of features comprises at least one of a set of brain signal features extracted from the at least one predefined brain signal, a set of image features extracted from the plurality of images, a set of audio features extracted from the audio dataset, and a set of textual features extracted from the textual dataset.

12. The system of claim 8, wherein the processor-executable instructions, on execution, further cause the processor to train the ML model based on a training dataset, wherein the training dataset comprises a truth dataset and a lie dataset, and wherein the label for each data in the truth dataset is a true value and the label for each data in the lie dataset is a false value.

13. The system of claim 8, wherein the processor-executable instructions, on execution, further cause the processor to evaluate the multimodal data to determine a relevant context at each of the predefined time intervals.

14. The system of claim 8, wherein the ML model is based on at least one of a Long Short-Term Memory (LSTM), a Recurrent Neural Network (RNN), or a Convolutional Neural Network (CNN).

15. A non-transitory computer-readable medium storing computer-executable instructions for detecting an instance of lie using a Machine Learning (ML) model, the computer-executable instructions configured for:
    extracting a set of features from an input data received from a plurality of data sources at predefined time intervals;
    combining the set of features from each of the plurality of data sources to obtain a multimodal data; and
    processing the multimodal data through the ML model to generate a label for the multimodal data, wherein the label is generated based on a confidence score of the ML model, and wherein the label is one of a true value that corresponds to an instance of truth or a false value that corresponds to an instance of lie.

16. The non-transitory computer-readable medium of claim 15, wherein the input data corresponding to the plurality of data sources comprises at least one of a brain signal dataset obtained from an Electroencephalography (EEG) device for a user, a video dataset associated with the user, and an audio dataset associated with the user.

17. The non-transitory computer-readable medium of claim 16, wherein the computer-executable instructions are further configured for:
    identifying at least one predefined brain signal from the brain signal dataset;
    transforming the audio dataset to a textual dataset using an audio-to-text conversion algorithm; and
    extracting a plurality of images from the video dataset.

18. The non-transitory computer-readable medium of claim 17, wherein the set of features comprises at least one of a set of brain signal features extracted from the at least one predefined brain signal, a set of image features extracted from the plurality of images, a set of audio features extracted from the audio dataset, and a set of textual features extracted from the textual dataset.

19. The non-transitory computer-readable medium of claim 15, wherein the computer-executable instructions are further configured for training the ML model based on a training dataset, wherein the training dataset comprises a truth dataset and a lie dataset, and wherein the label for each data in the truth dataset is a true value and the label for each data in the lie dataset is a false value.

20. The non-transitory computer-readable medium of claim 15, wherein the computer-executable instructions are further configured for evaluating the multimodal data to determine a relevant context at each of the predefined time intervals.

* * * * *